United States Patent [19]
Honda et al.

[11] 4,039,483
[45] Aug. 2, 1977

[54] METHOD OF PRODUCING AN ION EXCHANGER BY REACTING UNSATURATED VULCANIZED OR POWDERED RUBBERS WITH IODINE ISOCYANATE AND THEN INTRODUCING ION EXCHANGE GROUPS BY FURTHER REACTION

[75] Inventors: Toshio Honda, Akigawa; Koichi Iwami, Kunitachi; Shoji Tanaka, Akigawa; Yukio Fukuura, Kodaira; Shoson Shibata, Tokyo; Yoshikatsu Suzuki; Itsuo Tanuma, both of Higashi-Murayama, all of Japan

[73] Assignee: Bridgestone Tire Company Limited, Tokyo, Japan

[21] Appl. No.: 644,681

[22] Filed: Dec. 29, 1975

[30] Foreign Application Priority Data

Dec. 28, 1974 Japan .................................. 49-3820

[51] Int. Cl.² ............................................ C08C 19/22
[52] U.S. Cl. ............................. 260/2.1 R; 260/2.2 R; 260/2.1 E; 260/3; 260/2.5 AC; 260/722; 260/874; 526/49; 526/46
[58] Field of Search .............. 260/2.1 R, 2.1 E, 2.2 R, 260/3, 874, 49

[56] References Cited
U.S. PATENT DOCUMENTS

| 3,228,920 | 1/1966 | D'Alelio | 260/2.2 R |
| 3,311,608 | 3/1967 | Murphy | 260/2.1 |
| 3,414,550 | 12/1968 | D'Alelio | 260/2.1 E |
| 3,582,508 | 6/1971 | McIntosh, Jr. | 260/887 |

OTHER PUBLICATIONS

C.A. vol. 74—Entry B534e–Gebelein, 1971.
C.A. vol. 66—Entry 85505d, Hasner, et al. 540-549, (1967).
C. Gebelein–Journal of Macromolecules Science, A5(2) pp. 433-442, Mar. 1971.

Primary Examiner—Joseph L. Schofer
Assistant Examiner—Peter F. Kulkosky
Attorney, Agent, or Firm—Sughrue, Rothwell, Mion, Zinn and Macpeak

[57] ABSTRACT

An ion exchanger is produced by reacting a substance containing carbon-to-carbon unsaturated double bond with a solution of iodine isocyanate in an organic solvent and then reacting the resulting isocyanate group added to said substance with a compound having the following formula $(X)_n R(Y)_m$ or $XY$ wherein X represents an addition active group to the isocyanate group, Y represents an ion-exchanging group or a chelating group, R represents an organic radical having any valence of from 2 to 6 and a molecular weight of 20 to 1000, and $n$ and $m$ are selected from integers of 1 to 5, respectively, provided that a sum of $n$ and $m$ is equal to the valence of R, to introduce the ion-exchanging group having ion-exchanging properties into said substance.

20 Claims, No Drawings

METHOD OF PRODUCING AN ION EXCHANGER BY REACTING UNSATURATED VULCANIZED OR POWDERED RUBBERS WITH IODINE ISOCYANATE AND THEN INTRODUCING ION EXCHANGE GROUPS BY FURTHER REACTION

BACKGROUND OF THE INVENTION

1. Field of the Invention

The present invention relates to a method of producing an ion exchanger by introducing an ion-exchanging active group into a substance containing carbon-to-carbon unsaturated double bond.

2. Description of the Prior Art

Up to now, there have been attempted many syntheses of ion exchange resins and chelate resins, but a few attempts are made practicable. For instance, as the chelate resin there are resins obtained by chloromethylation of styrene-divinylbenzene copolymer particles and subsequent iminodiacetylation thereof, resins obtained by chloromethylation of styrene-divinylbenzene copolymer particles and subsequent addition of polyethylene polyamine thereto, and the like. In any of these resins, however, styrene-divinylbenzene copolymer is used as a raw material, so that there is a restriction to the raw materials to be used and further the resulting chelate resins are expensive.

Recently, techniques for utilizing ion exchangers as vegetable culture medium and soil conditioner have been reported. For example, there are known urethane foams containing a chemically fixed ion-exchanging group, which are obtained by adding polyol modified with acid anhydride upon foaming and the like. In this way, however, there is a drawback that properties of foam and/or workability become sacrificed in accordance with an increase of an ion exchange capacity.

SUMMARY OF THE INVENTION

It is, therefore, an object of the present invention to solve the above mentioned drawbacks in the prior art and to easily produce inexpensive ion exchangers having improved ion-exchanging properties.

It is another object of the present invention to produce ion exchangers in the form of powder, particle, lump, foam and the like from wide-ranging substances without material restrictions.

The present invention provides a method of producing an ion exchanger which comprises reacting a substance containing carbon-to-carbon unsaturated double bond with a solution of iodine isocyanate in an organic solvent and then reacting the resulting isocyanate group added to said substance with a compound having the following formula

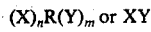

$(X)_n R(Y)_m$ or $XY$ wherein X represents an addition active group to the isocyanate group, Y represents an ion-exchanging group or a chelating group, R represents an organic radical having any valence of from 2 to 5 and a molecular weight of 20 to 1000, and $n$ and $m$ are selected from integers of 1 to 5, respectively, provided that a sum of $n$ and $m$ is equal to the valence of R, to introduce the ion-exchanging group having ion-exchanging properties into said substance.

According to the present invention, waste products such as waste tires, waste belts, foam rubber and the like in rubber industry may be utilized to produce useful ion exchangers.

In the present invention, ion exchangers having improved workability and properties usable as soil conditioner and vegetable culture medium can be produced from foam rubber.

Furthermore, the present invention makes it possible to produce ion exchangers which may be used as a metal ion deactivator for removing metal ions contained in waste from industries and mines.

DESCRIPTION OF THE PREFERRED EMBODIMENTS

As the substance containing carbon-to-carbon unsaturated double bond to be used in the present invention, there are any materials capable of introducing an ion-exchanging group or a chelating group into the double bond without restriction.

The material containing such carbon-to-carbon unsaturated double bond may be any state of rubber, plastic and liquid and its form may be either one of lump, particle, powder, sheet artificial leather, fiber, foam and the like. Especially, natural rubbers, diene series synthetic rubbers, unsaturated olefin rubbers and the like are preferable. As a typical example of this material, mention may be made of natural rubber, guttapercha, balata, polyisoprene, polybutadiene, polychloroprene, styrene-butadiene copolymer, butadiene-acrylonitrile copolymer, butadiene-acrylonitrile-styrene terpolymer, isobutylene-isoprene copolymer, multi-component polymers of ethylene-propylene-unsaturated monomers, polypentenamer and the like. Of course, these materials containing the carbon-to-carbon unsaturated double bond may contain common compounding agents for rubber and plastic, such as reinforcing agent, vulcanizer, plasticizer, ultra-violet ray absorbing agent, flame retardant, foaming agent, filler and the like. Furthermore, these materials may be used in crosslinked state or uncrosslinked state.

In the production of ion exchangers according to the present invention, the use of the following materials is advantageous in industry:

1. vulcanized rubber particles; these materials are obtained by pulverizing waste product or scrap such as scorched rubber, yarn-bearing rubber and the like from tires, conveyor belt, rubber crawler, floor covering, rug, hose, dock fender, shoe sole, air spring and the like in the conventional manner. Particularly, the materials having a particle size of less than 10 mm are preferable. The coarse material can be further pulverized after treated with iodine isocyanate according to the present invention.
2. powdered rubber from latex; and
3. foam rubber and the like.

According to the present invention, the substance of various states containing the unsaturated double bond as mentioned above is first reacted with iodine isocyanate to produce a substance containing an isocyanate group as an intermediate for the production of ion exchangers.

The iodine isocyanate is usually used as a solution in an organic solvent. The organic solvent includes, for example, ether-series solvents such as diethyl ether, tetrahydrofuran, ethylene glycol diethyl ether, petroleum ether and the like; normal heptane, methylene chloride, toluene, dioxane and the like. Particularly, dioxane is preferable considering from shelf stability of iodine isocyanate solution. The concentration of iodine isocyanate in the solution is 0.02 to 1.0 mole, preferably 0.1 to 0.5 mole. The reaction temperature between the iodine isocyanate solution and the unsaturated double bond-containing substance is not particularly limited, but it is usually −60° to +30° C. When dioxane is used as a solvent for iodine isocyanate, the reaction is carried out at a temperature of 10° to 30° C. An amount of iodine isocyanate used to the unsaturated double bond-containing substance is usually not more than one equivalent per one equivalent of the double bond in the substance and is determined in connection with a desired capacity of the ion exchanger to be produced because iodine isocyanate quantitatively reacts with the double bond in the substance.

According to the present invention, the substance containing an isocyanate group obtained by the reaction of the unsaturated double bond-containing substance with iodine isocyanate is reacted with a compound having the following formula $$(X)_n R(Y)_m \text{ or } XY$$

wherein X represents an addition active group to the isocyanate group, Y represents an ion-exchanging group or a chelating group, R represents an organic radical having any valence of from 2 to 6 and a molecular weight of 20 to 1000, and $n$ and $m$ are selected from integers of 1 to 5, respectively, provided that a sum of $n$ and $m$ is equal to the valence of R, to produce a desired ion exchanger.

In the above formula, the addition active group X is preferably functional groups containing active hydrogen, which include a hydroxyl group, a sulfonic group, an amino group, a hydrazino group, a mercapto group, an imino group, an imidazolino group and the like. These active groups may be same or different when $n$ is an integer of more than 2.

The ion-exchanging group or chelating group Y includes a carboxyl group, a sulfonic group, primary, secondary and tertiary amino groups, an ammonium ion, a mercapto group, a hydroxyl group, a thiocarboxyl group, a dithiocarboxyl group, a pyridyl group, a dithiocarbamic group, an acetonitrile group, a hydrazino group and the like. These groups may be same or different when m is an integer of more than 2.

The organic radical R has a molecular weight of 20 to 1000 and includes a hydrocarbon residue, an ether-containing residue, an ester-containing residue, an amido-containing residue, a carbonyl-containing residue, a thioether-containing residue, a thioester-containing residue, a thioamide-containing residue, a thiocarbonyl-containing residue, an amino-containing residue and the like.

As the compound having the above organic radical R, mention may be made of aminocarboxylic acids such as glycin, α- and β-alanines, 6-aminocaproic acid, 4-aminobutyric acid, sarcosine, methionine, leucine, iso-leucine, serine, valine, ornithine, histidine, lysine, phenylalanine, threonine, cystine, asparagine, glutamine, arginine, aspartic acid, glutamic acid, iminodiacetic acid, iminodipropionic acid and the like; aminonitriles such as iminodiacetonitrile, iminodipropionitrile, aminoacetonitrile, aminopropionitrile and the like; imines such as ethyleneimine and the like; polyamines such as ethylenediamine, N,N-dimethyl ethylenediamine, N,N-diethyl ethylenediamine, N,N'-dimethyl ethylenediamine, N,N'-diethyl ethylenediamine, diethylenetriamine, triethylenetetramine, tetraethylenepentamine, polyethyleneimine and the like; hydrazine and its derivatives; carbazide, semicarbazide, thiosemicarbazide and their derivatives; guanidine and its derivatives; α-, β- and γ-aminopyridines and their derivatives; oxy acids such as tartaric acid, malic acid, citric acid, dimethylol propionic acid, dimethylol butyric acid and the like; and aminosulfonic acids as aminosulfonic acid, hydroxylaminosulfonic acid, hydrazine disulfonic acid and the like.

Among the above mentioned compounds, glycine, cystine, iminodiacetonitrile, ethyleneimine, N,N-diethyl ethylenediamine, tetraethylenepentamine, thiosemicarbazide and α-aminopyridine are preferable. This compound is used in an equivalent amount of 1 to 10 times, preferably 2 to 5 times based on the isocyanate group in the substance containing the isocyanate group.

According to the present invention, the reaction between the isocyanate group-containing substance and the compound of the formula $(X)_n R(Y)_m$ or XY is carried out in the absence or presence of a solvent. As the solvent, use may be made of water and organic solvents such as tetrahydrofuran, benzene, chloroform, acetone, methylene chloride and the like. The reaction temperature can be varied depending upon kinds of the compound and solvent to be used, but it is usually 0° to 100° C, preferably 10° to 40° C.

As mentioned above, according to the present invention ion exchangers can be produced from the unsaturated double bond-containing substances. And also, the thus obtained ion exchanger can be subjected to the following treatments to obtain a corresponding ion exchanger without departing from the scope of the present invention.

1. A carboxymethylation or carboxyethylation can be carried out by reacting primary or secondary amino group of the ion exchanger with a carboxymethylating agent such as monochloroacetic acid, monobromoacetic acid and the like or a carboxyethylating agent such as monochloropropionic acid and the like.

2. A dithiocarbamation can be carried out by reacting the ion exchanger with carbon disulfide in the presence of a solvent and/or a catalyst.

3. A quaternary halide such as methyl iodide or ethyl iodide can be added to tertiary amino group in the ion exchanger.

4. After an isocyanate group is added to an unsaturated double bond-containing substance, the resulting product is reacted with one of aminoitriles and further hydrolyzed with an alkali solution or acid solution, whereby a carboxyl group-containing ion exchanger can be produced.

5. After an isocyanate group is added to an unsaturated double bond-containing substance, the resulting product is reacted with methanol or ammonia in the presence of a catalyst and further treated with an alkali solution to form a product having an aziridine ring, which is reacted with a compound represented by the formula of $(X)_n R(Y)_m$ or XY.

The ion exchangers obtained by the method of the present invention are used as a cation exchanger when they indicate acidic in water and as an anion exchanger when they indicate basic in water. Further, ion exchangers containing both acidic group and basic group can be used as an amphoteric ion exchanger.

Moreover, the most of the ion exchangers according to the present invention form a chelating bond with a metal ion within a certain range of pH, so that they can be used as a chelating material or a chelate resin.

The following examples are given in illustration of this invention and are not intended as limitations thereof.

EXAMPLE 1

In a 1000 ml brown bottle were weighed and placed 20 g of iodine, 26 g of silver cyanate and 400 g of dioxane and the bottle was sealed. Then, the resulting mass was reacted at room temperature for 5 hours while being stirred with a magnetic stirrer.

After the completion of the reaction, the resulting iodine isocyanate solution was filtered through a glass filter. The concentration of iodine isocyanate in the filtrate was measured to be 0.13 mole. This solution was stored in a brown bottle.

Three grams of carbon black-containing vulcanized rubber particles having a size of 2–4 mm, which are obtained from tread portion of waste tire by a mechanical cutting method, was washed with acetone and placed in a 500 ml Erlenmeyer flask. Then, 200 ml of the iodine isocyanate solution was added and then immersion treatment was carried out at room temperature for 2 hours. After washeed with acetone, the thus treated particles were ground in a mortar in acetone wetted state and passed through a wire gauze of 20 mesh. The unpassed portions were further ground in a mortar and completely passed through the wire gauze.

The particles treated with iodine isocyanate were swollen with 100 ml of tetrahydrofuran (hereinafter abbreviated to as THF) and a mixed solution of 20 g of tetraethylenepentamine and 20 g of THF was added thereto. The resulting mixture was reacted at room temperature for 3 hours while being stirred with a magnetic stirrer. Thereafter, the resulting product was filtered and further treated with 200 ml of 1N aqueous sodium hydroxide solution for 5 hours.

After the reaction product was thoroughly washed with water, the thus obtained ion exchanger was filtered and stored in wet state.

The ion adsorption of the ion exchanger was determined as follows: that is, a buffer solution having an ionic strength of 0.02, a pH of 5.1 and a copper ion concentration of 0.02 mole was prepared using potassium hydrogenphthalate, copper sulfate and sodium hydroxide. 0.15 g of the ion exchanger was immersed in 50 ml of the buffer solution over night and thereafter a residual amount of copper ion was measured by a starch-iodine reaction method. Then the dry weight of the ion exchanger was measured after it was filtered and heated in an oven. As a result, the copper ion adsoprtion of the ion exchanger was 0.80 mmole/g (provided that the ion adsorption was based on the dry weight (g) of the ion exchanger).

EXAMPLE 2

Into a 5 l beaker was charged 500 ml of styrene-butadiene copolymer latex (made by Japan Synthetic Rubber Co., Ltd. under a trade name "SBR-2108") and then 250 ml of a 1:1 (V/V) mixed solution of 5% aqueous sodium chloride solution and acetone was added thereto at once while being stirred with an agitator. The resulting mixture became uniform in about 5 minutes. Next, 500 ml of a 2:3 (V/V) mixed solution of 5% aqueous sodium chloride solution and acetone was further added at once. Thereafter, the resulting mass was stirred for 10 minutes, filtered and washed with acetone.

The thus obtained flock-like rubber was stirred in acetone by means of a homomixer to obtain powdered rubber of 50 to 100 mesh. This powdered rubber was used in acetone-wetted state in this example, but it can be used after dried.

Ten grams of the powdered rubber in acetone-wetted state (dry weight: 2.5 g) was placed in a 500 ml Erlenmeyer flask and 200 ml of the same solution of iodine isocyanate in dioxane as used in Example 1 was added thereto. The resulting mixture was reacted at room temperature for 2 hours while being stirred with a stirrer, washed with acetone, swollen with 100 ml of THF, and added with a mixed solution of 10 g of tetraethylenepentamine and 20 g of THF. Then, the resulting mixture was reacted at room temperature for 3 hours with stirring, filtered and further treated with 200 ml of 1N aqueous sodium hydroxide solution for 5 hours. The thus obtained ion exchanger was thoroughly washed with water, filtered and stored in wet state. The copper ion adsorption of this ion exchanger was 1.33 mmole/g at a pH of 5.

EXAMPLE 3

Twenty grams of iodine and 400 g of THF were weighed and charged into a 1000 ml separable flask and then stirred in a dry ice-acetone bath at −30° C to −50° C. The resulting mass was sufficiently cooled and added with 30 g of silver cyanate finely divided in a mortar. The resulting mixture was reacted for 5 hours as it was.

During the reaction, the separable flask was covered with an aluminum foil to shield a light. After the completion of the reaction, the resulting iodine isocyanate solution was filtered through a glass filter. The concentration of iodine isocyanate in the filtrate was measured to be 0.20 mole. This solution was placed in a brown bottle and stored in a dry ice jar.

Two point two grams of rubber foam for cushion (made of SBR) cut at a size of 20 to 50 mm was washed with acetone, charged together with 100 ml of THF into a 1000 ml separable flask and then stirred in a dry ice-acetone bath at −10° to −30° C. After the resulting mass was sufficiently cooled, 130 ml of the above THF solution of iodine isocyanate was added dropwise through a dropping funnel and then the resulting mixture was reacted for 3 hours. The thus treated foam was washed with acetone, swollen with 300 ml of THF, added with a mixed solution of 20 g of tetraethylenepentamine and 20 g of THF and reacted at room temperature for 3 hours with stirring. The resulting product was filtered and further treated with 200 ml of 1N aqueous sodium hydroxide solution for 5 hours. The thus obtained ion exchanger was thoroughly washed with water, filtered and stored in wet state.

This ion exchanger had a copper ion adsorption of 1.35 mmole/g at a pH of 5 and a hydrochloric acid adsorption of 4.74 mmole/g.

EXAMPLE 4

The foam treated with iodine isocyanate as described in Example 3 was swollen with 300 ml of THF and a solution of 7.5 g of glycine and 6 g of sodium hydroxide in 30 ml of water was added thereto at once. The resulting mixture was reacted at room temperature for 10 hours with stirring. The resulting product was filtered, treated with 200 ml of 1N aqueous sodium hydroxide solution for 1 hour, washed with water, filtered and stored in wet state.

The thus obtained ion exchanger had a copper ion adsorption of 1.45 mmole/g at a pH of 5 and a sodium hydroxide adsorption of 1.86 mmole/g.

EXAMPLE 5

The foam treated with iodine isocyanate as described in Example 3 was swollen with 300 ml of THF and a solution of 9.5 g of iminodiacetonitrile in 30 ml of THF was added thereto at once. The resulting mixture was reacted at room temperature for 15 hours with stirring, washed with water and then filtered.

The reaction product was charged into a 1000 ml separable flask and further treated with 300 ml of 1N aqueous sodium hydroxide solution for 24 hours. The thus obtained ion exchanger was washed with water, filtered and stored in wet state.

This ion exchanger had a copper ion adsorption of 1.49 mmole/g at a pH of 5 and a sodium hydroxide adsorption of 2.61 mmole/g.

EXAMPLE 6

The foam treated with iodine isocyanate as described in Example 3 was swollen with 300 ml of THF and a solution of 11.6 g of N,N-diethyl ethylenediamine in 30 ml of THF was added thereto at once. Then, the resulting mixture was reacted at room temperature for 5 hours with stirring, washed with water and filtered. The resulting product was immersed in a mixed solution of 14 g of methyl iodide, 100 ml of dimethylformamide and 100 ml of water for 24 hours, washed with water and further with methanol and filtered.

The thus obtained reaction product was treated with 300 ml of 1N solution of potassium hydroxide in methanol for 5 hours with stirring. The resulting ion exchanger was washed with water, filtered and stored in wet state. This ion exchanger had a chloride ion adsorption of 4.23 mmole/g.

EXAMPLE 7

The foam treated with iodine isocyanate as described in Example 3 was swollen with 300 ml of THF and a solution of 9.5 g of $\alpha$-aminopyridine in 50 ml of THF was added thereto at once. The resulting mixture was reacted at room temperature for 24 hours with stirring. The resulting product was filtered, treated with 200 ml of 1N aqueous sodium hydroxide solution for 1 hour, washed with water, filtered and stored in wet state. The thus obtained ion exchanger had a hydrochloric acid adsorption of 2.37 mmole/g.

EXAMPLE 8

The foam treated with iodine isocyanate as described in Example 3 was added to a solution of 12.1 g of L-cystine in 150 ml of acetic acid and reacted at room temperature for 24 hours with stirring. The resulting product was filtered, treated with 200 ml of 1N aqueous sodium hydroxide solution for 1 hour, washed with water, filtered and stored in wet state.

The thus obtained ion exchanger had a copper ion adsorption of 1.86 mmole/g at a pH of 5 and a sodium hydroxide adsorption of 2.00 mmole/g.

EXAMPLE 9

The foam treated with iodine isocyanate as described in Example 3 was added to a solution of 8.5 g of thiosemicarbazide in 150 ml of acetic acid and reacted at room temperature for 24 hours with stirring. The resulting product was filtered, treated with 200 ml of 1N aqueous sodium hydroxide solution for 1 hour, washed with water, filtered and stored in wet state. The thus obtained ion exchanger had a copper ion adsorption of 0.51 mmole/g at a pH of 5 and a hydrochloric acid adsorption of 2.65 mmole/g.

EXAMPLE 10

Fifteen grams of the same powdered rubber in acetone-wetted state as obtained in Example 2 (dry weight:3.5 g) was charged into a 1000 ml separable flask, swollen with 50 ml of acetone and then stirred in a dry ice-acetone bath at $-10°$ C to $-30°$ C. After the resulting mass was sufficiently cooled, 100 ml of the same THF solution of iodine isocyanate as used in Example 3 was added dropwise through a dropping funnel. The resulting mixture was reacted for 2 hours as it was, filtered, swollen with 100 ml of THF, and then 100 ml of the THF solution of iodine isocyanate was added dropwise through a dropping funnel while being stirred in a dry ice-acetone bath at $-10°$ to $-30°$ C and thereafter the reaction was further continued for 3 hours.

The thus treated powdered rubber was washed with acetone, swollen with 100 ml of THF, added with a mixed solution of 20 g of tetraethylenepentamine and 20 g of THF, reacted at room temperature for 3 hours with stirring. The resulting product was filtered and further treated with 200 ml of 1N aqueous sodium hydroxide solution for 5 hours. The thus obtained ion exchanger was thoroughly washed with water, filtered and stored in wet state. This ion exchanger had a copper ion adsorption of 1.77 mmole/g at a pH of 5.

EXAMPLE 11

Fifty grams of calcium carbonate was added to 100 g of styrene-butadiene copolymer latex (made by Japan Synthetic Rubber Co., Ltd. under a trade name "SBR-2108") and the resulting mixture was uniformly dispersed by means of a homogenizer. Thereafter, 30 ml of 5% aqueous sodium chloride solution was added while being stirred with an agitator and 300 ml of acetone was further added to separate solid portions. After filtered, the solid portions were washed with acetone, while being stirred with an agitator, to obtain powdered rubber of 50 to 100 mesh.

Twenty grams of the powdered rubber in acetone-wetted state (dry polymer weight: 3.5 g) was charged into a 1000 ml Erlenmeyer flask, swollen with 100 ml of acetone, added with 100 ml of the same THF solution of iodine isocyanate as used in Example 3 and then the resulting mixture was stirred at room temperature for 1 hour. After the filtration, the resulting product was swollen with 100 ml of THF and added with 100 ml of the THF solution of iodine isocyanate and then the stirring was continued at room temperature for 1 hour. After washed with acetone, the thus treated powdered rubber was swollen with 100 ml of THF, added with a mixed solution of 20 g of tetraethylene-pentamine and 20 g of THF and then the resulting mixture was reacted at room temperature for 3 hours with stirring. Next, the resulting product was washed with water, filtered and treated with 200 ml of 1N aqueous hydrochloric acid solution for 3 hours.

The resulting product was thoroughly washed with water, filtered, treated with 200 ml of 1N aqueous sodium hydroxide solution for 1 hour, thoroughly washed with water, filtered and stored in wet state. The thus obtained ion exchanger had a copper ion adsorption of 1.3 mmole/g at a ph of 5.

EXAMPLE 12

Five grams of tetraethylenepentamine-type ion exchanger obtained in Example 10 was immersed in 50 ml of carbon disulfide for 2 days. The resulting product was washed with acetone and water, filtered and stored in wet state. The thus obtained ion exchanger had a copper ion adsorption of 1.5 mmole/g at a pH of 5.

EXAMPLE 13

Five grams of tetraethylenepentamine-type ion exchanger obtained in Example 10 was charged into a 500 ml Erlenmeyer flask and a solution of 50 g of sodium monochloro-acetate and 25 g of potassium carbonate in 300 ml of water was added thereto. The resulting mixture was stirred under reflux for 20 hours. The thus obtained ion exchanger was washed with water, filtered and stored in wet state.

This ion exchanger had a copper ion adsorption of 0.8 mmole/g at a pH of 5.

EXAMPLE 14

The foam treated with iodine isocyanate as described in Example 3 was charged into a 300 ml Erlenmeyer flask, added with 25 g of ethyleneimine monomer and then immersed therein at room temperature for 2 days.

The thus obtained ion exchanger was washed with acetone and water, filtered and stored in wet state.

This ion exchanger had a copper ion adsorption of 1.83 mmole/g at a pH of 5.

What is claimed is:

1. A method of producing an ion exchanger comprising
   a. reacting a substance containing carbon-to-carbon unsaturated double bonds selected from the group consisting of vulcanized rubbers, powdered rubbers from latex and foam rubber with a solution of iodine isocyanate in an organic solvent wherein the amount of iodine isocyanate is not more than one equivalent per equivalent of the double bond in the substance; and then
   b. reacting the resulting isocyanate group added to said substance with a compound having the following formula $(X)_n R(Y)_m$ or XY wherein X represents an addition active group to the isocyanate group, Y represents an ion-exchanging group or a chelating group, R represents an organic radical having any valence of from 2 to 6 and a molecular weight of 20 to 1000, and n and m are selected from integers of 1 to 5, respectively, provided that a sum of n and m is equal to the valence of R, to introduce the ion-exchanging group having ion-exchanging properties into said substance.

2. The method as claimed in claim 1 wherein the concentration of iodine isocyanate in said organic solvent solution is 0.02 to 1.0 mole.

3. The method as claimed in claim 1 wherein said organic solvent for iodine isocyanate is at least one solvent selected from the group consisting of diethyl ether, tetrahydrofuran, ethylene glycol diethyl ether, petroleum ether, normal heptane, methylene chloride, toluene and dioxane.

4. The method as claimed in claim 3 wherein said organic solvent for iodine isocyanate is dioxane.

5. The method as claimed in claim 1 wherein said substance containing carbon-to-carbon unsaturated double bond and said solution of iodine isocyanate in organic solvent are reacted at a temperature of 60° C to 30° C.

6. The method as claimed in claim 1 wherein said compound of the formula $(X)_n R(Y)_m$ or XY is at least one compound selected from the group consisting of aminocarboxylic acids, aminonitriles, ethyleneimine, polyamines, hydrazine, carbazides, guanidine, aminopyridines, oxy acids and aminosulfonic acids.

7. The method as claimed in claim 6 wherein said aminocarboxylic acid is at least one compound selected from the group consisting of glycine, α- and β-alanines, 6-aminocaproic acid, 4-aminobutyric acid, sarcosine, methionine, leucine, isoleucine, serine, valine, ornithine, histidine, lysine, phenylalanine, threonine, cystine, asparagine, glutamine, arginine, aspartic acid, glutamic acid, iminodiacetic acid and iminodipropionic acid.

8. The method as claimed in claim 6 wherein said aminonitrile is at least one compound selected from the group consisting of iminodiacetonitrile, iminodipropionitrile, aminoacetonitrile and aminopropionitrile.

9. The method as claimed in claim 6 wherein said polyamine is at least one compound selected from the group consisting of ethylenediamine, N,N-dimethyl ethylenediamine, N,N-diethyl ethylenediamine, N,N'-dimethyl ethylenediamine, N,N'-diethyl ethylenediamine, diethylenetriamine, triethylenetetramine, tetraethylenepentamine and polyethyleneimine.

10. The method as claimed in claim 6 wherein said carbazide is at least one compound selected from the group consisting of carbazide, semicarbazide and thiosemicarbazide.

11. The method as claimed in claim 6 wherein said aminopyridine is at least one compound selected from the group consisting of α-aminopyridine, β-aminopyridine and γ-aminopyridine.

12. The method as claimed in claim 6 wherein said oxy acid is at least one compound selected from the group consisting of tartaric acid, malic acid, citric acid, dimethylol propionic acid and dimethylol butyric acid.

13. The method as claimed in claim 6 wherein said aminosulfonic acid is at least one compound selected from the group consisting of aminosulfonic acid, hydroxylaminosulfonic acid and hydrazine disulfonic acid.

14. The method as claimed in claim 6 wherein said compound of the formula $(X)_n R(Y)_m$ or XY is at least one compound selected from the group consisting of glycine, cystine, iminodiacetonitrile, ethyleneimine, N,N-diethyl ethylenediamine, tetraethylenepentamine, thiosemicarbazide and α-aminopyridine.

15. The method as claimed in claim 1 wherein said compound of the formula $(X)_n R(Y)_m$ or XY is in a solvent.

16. The method as claimed in claim 15 wherein said solvent is at least one solvent selected from the group consisting of tetrahydrofuran, benzene, chloroform, acetone, methylene chloride and water.

17. The method as claimed in claim 1 wherein said isocyanate group added to the substance containing carbon-to-carbon unsaturated double bond is reacted with said compound of the formula $(X)_n R(Y)_m$ or XY at a temperature of 0° to 100° C.

18. The method as claimed in claim 1 wherein said compound of the formula $(X)_n R(Y)_m$ or XY is reacted in an equivalent amount of 1 to 10 times based on the group X per the isocyanate group added to the substance containing carbon-to-carbon unsaturated double bond.

19. The method as claimed in claim 1 wherein said vulcanized rubber is obtained in the form of lump, particle, powder and sheet from waste products of tire, conveyor belt, rubber crawler, floor covering, rug, hose, dock fender, shoe sole and air spring.

20. A method of producing an ion exchanger comprising
   a. reacting a substance containing carbon-to-carbon unsaturated double bonds selected from the group consisting of vulcanized rubbers, powdered rubbers from latex and foam rubber with a solution of iodine isocyanate in dioxane at a temperature of 10° to 30° C wherein the amount of iodine isocyanate is not more than one equivalent per equivalent of the double bond in the substance; and then
   b. reacting the resulting isocyanate group added to said substance with an equivalent amount of 1 to 10 times per the isocyanate group of at least one compound selected from the group consisting of glycine, cystine, iminodiacetonitrile, ethyleneimine, N,N-diethyl ethylenediamine, tetraethylenepentamine, thiosemicarbazide and α-aminopyridine at a temperature of 0° to 100° C.

* * * * *